United States Patent [19]

König et al.

[11] Patent Number: 4,631,317

[45] Date of Patent: Dec. 23, 1986

[54] PRODUCTION OF SULPHONIC ACID GROUP-CONTAINING ACRYLONITRILE POLYMERS AND MONOMERS THEREFOR

[75] Inventors: Joachim König, Odenthal; Siegfried Korte, Leverkusen, both of Fed. Rep. of Germany

[73] Assignee: Bayer Aktiengesellschaft, Leverkusen, Fed. Rep. of Germany

[21] Appl. No.: 672,551

[22] Filed: Nov. 19, 1984

[30] Foreign Application Priority Data

Nov. 25, 1983 [DE] Fed. Rep. of Germany ....... 3342694

[51] Int. Cl.⁴ ............................................... C08F 8/00
[52] U.S. Cl. ................................ 525/383; 525/328.5; 525/368; 525/369; 526/230; 526/287
[58] Field of Search ...................... 525/383, 328.5, 368, 525/369; 526/287, 230

[56] References Cited

U.S. PATENT DOCUMENTS

| | | | |
|---|---|---|---|
| 4,126,603 | 11/1978 | Lorenz et al. | 526/287 |
| 4,143,020 | 3/1979 | Emmons et al. | 526/81 |
| 4,336,022 | 6/1982 | Lynch et al. | 525/328.5 |
| 4,535,139 | 8/1985 | Brauer et al. | 526/287 |

*Primary Examiner*—Joseph L. Schofer
*Assistant Examiner*—Bernard Lipman
*Attorney, Agent, or Firm*—Sprung Horn Kramer & Woods

[57] ABSTRACT

Sulphonic acid-and sulphonate group-containing acrylonitrile polymers are advantageously obtained by precipitation copolymerization in aliphatic hydrocarbons using ethylenically unsaturated sulphonic esters free from carboxylic acid and carboxylic acid ester groups as comonomers and saponifying the sulphonic acid ester groups of the copolymer before, during or after shaping.

17 Claims, No Drawings

PRODUCTION OF SULPHONIC ACID GROUP-CONTAINING ACRYLONITRILE POLYMERS AND MONOMERS THEREFOR

DE-OS No. 2 833 143 describes the polymerisation of acrylonitrile alone or in the presence of further copolymerisable monomers at temperatures of 0° to 60° C. in an aliphatic hydrocarbon having a boiling point between −10° and 80° C. or in mixtures of aliphatic hydrocarbons having boiling ranges between −10° and 80° C., using a starter system consisting of 0.1 to 8.0 mol % of sulphur dioxide, 0.1 to 2.0 mol % of a hydroperoxide which is soluble in the reaction medium and 0.01 to 1.0 mol % of an acid which is soluble in the reaction system (each based on the quantity of monomer used).

It has been found that the dye behaviour of the fibres and filaments produced from these polymers does not meet all the requirements.

As the copolymerisation of sulphonic acid and sulphonate group-containing comonomers with acrylonitrile is not successful in aliphatic hydrocarbons, the object of the present invention was to propose an improved process for the production of sulphonic acid- and sulphonate group-containing acrylonitrile polymers by polymerisation in aliphatic hydrocarbons.

The invention relates to a process for the production of sulphonic acid and sulphonate group-containing acrylonitrile copolymers by copolymerisation of 75 to 99.95% by weight, preferably 85 to 95% by weight, of acrylonitrile, up to 24.95% by weight, preferably up to 14.9% by weight, of further copolymerisable monomers free of ionic or sulphonic acid ester groups and 0.05 to 8% by weight, preferably 0.1 to 6% by weight, of a third component in aliphatic hydrocarbons using a redox catalyst, characterised in that the third component is an ethylenically unsaturated sulphonic acid ester free from carboxylic acid and carboxylic acid ester groups, and the sulphonic acid ester groups of the copolymer are saponified before, during or after shaping the percentages relating to total quantity of monomers.

The filaments or fibres produced from these polymers are distinguished by a very good basic dye uptake.

The filaments and fibres are produced by conventional spinning methods.

Suitable unsaturated sulphonic acid esters include esters of vinyl sulphonic acid such as vinyl sulphonic acid methyl ester, vinyl sulphonic acid ethyl ester, vinyl sulphonic acid butyl ester, esters of allyl and methallyl sulphonic acid such as allyl sulphonic acid methyl ester, allyl sulphonic acid ethyl ester, methallyl sulphonic acid methyl ester, methallyl sulphonic acid ethyl ester, esters of styrene sulphonic acid such as styrene sulphonic acid methyl ester, styrene sulphonic acid ethyl ester, styrene sulphonic acid propyl ester, styrene sulphonic acid butyl ester, styrene sulphonic acid isobutyl ester or styrene sulphonic acid hexyl ester, esters of 2-acrylamido-2-methylpropane sulphonic acid such as 2-acrylamido-2-methylpropane sulphonic acid methyl ester or 2-acrylamido-2-methylpropane sulphonic acid ethyl ester and esters of N-(sulphophenyl)- maleic imide such as N(4-methoxysulphonylphenyl) maleic imide or N(4-ethoxysulphonylphenyl) maleic imide.

The compounds are mainly known.

Esters of N-(sulphophenyl) maleic imide are novel and also form the subject of the invention, in particular the $C_1$-$C_4$— alkyl esters.

Suitable monomers which are free from ionic and sulphonic ester groups include, for example, esters of acrylic and methacrylic acid, vinyl esters of aliphatic carboxylic acids, styrene, α-methyl styrene or 4-tertiary-butyl styrene as well as maleic acid anhydride and N-substituted maleic acid imides the substituent being a linear, branched or cyclic alkyl radical with up to 12 carbon atoms or an unsubstituted or substituted aromatic ring.

The aliphatic hydrocarbons, which are used pure or as a mixture, have boiling points between −10° and +135° C. Examples include n-butane, n-pentane, n-hexane, octane mixtures, cyclohexane, methylcyclohexane, petroleum ether, light petroleum and ligroin.

The hydrocarbons preferably have boiling points between 90° and 130° C.

The polymerisation is carried out continuously or intermittently as precipitation polymerisation at 0° to 60° C. The conversions are 50 to 95% by weight, and the monomer concentration is 7 to 35% by weight.

A suitable redox system consists of $SO_2$ and an organic hydroperoxide. A system-soluble acid can also be present.

The sulphur dioxide can be supplied to the starting polymerisation mixture both in liquid and in gaseous form in quantities of 0.1 to 8.0 mol %, based on monomer.

Preferred hydroperoxides which are soluble in the reaction medium are those substituted with secondary and tertiary alkyl groups as well as arylalkyl groupcontaining types, in quantities of 0.1 to 2 mol % based on monomer.

An $SO_2$/hydroperoxide molar ratio of 1:1 to 6:1 is advantageous.

System - soluble acids, preferably used in quantities of 0.01 to 1.0 mol %, based on monomers, include for example partially halogenated and perhalogenated carboxylic acids with up to 10 carbon atoms, preferably trichloroacetic acid, perchloropropionic acid and perchlorobutyric acid.

The polymers are obtained after conventional processing as finely divided powders with bulk densities of 0.1 to 0.5 g cm$^3$. A 20 to 30% pure spinning solution is produced by conventional processes by introducing the powders into suitable polar solvents such as, for example, dimethyl formamide, dimethyl acetamide or dimethyl sulphoxide and dissolving them in heatable dissolving tanks, in screws or kneaders.

The sulphonic acid ester groups present in the polymers can be converted into sulphonic acid or sulphonate groups by treatment with an aqueous medium at any stage of processing, the spinning process, the after-treatment or during the dyeing process.

The sulphonic acid ester groups are preferably converted into sulphonic acid and sulphonate groups in aqueous media during the after-treatment or during the dyeing process, as no additional operating stages are necessary in these cases.

The K values for the polymers listed in the following Examples were determined at 25° C. in 0.5% pure dimethyl formamide solution according to Fikentscher, Cellulosechemie 13, (1932), page 58. The limit viscosity values [η] listed in the Examples were measured in dimethyl formamide at 25° C. and are given dl/g. The dye uptake was determined according to U.S. Pat. No. 4,326,051 using the dye corresponding to the formula:

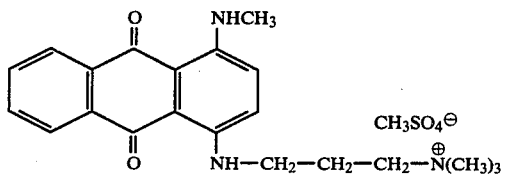

CH$_3$SO$_4^\ominus$

EXAMPLE 1

As starting material,
540 g methyl cyclohexane
33 g acrylonitrile
2.3 g acrylic acid methyl ester
1.1 g AMPS methyl ester (methyl ester of 2-acrylamido-2-methylpropanesulphonic acid)
2.8 g of a 7.5% by weight solution of tertiary butyl hydroperoxide in methylcyclohexane were introduced into a 3 liter stirrer vessel with helical stirrer and reflux condenser.

After passing over nitrogen and heating to 45° C., polymerisation was initiated by addition of

Starter solution 1
20 g acrylonitrile
1.1 g acrylic acid methyl ester
0.6 g sulphur dioxide Immediately afterwards, the following two solutions were added simultaneously over 5 hours at 45° C. and at a constant metering rate:

Solution 2
882 g methylcyclohexane
242.5 g acrylonitrile
16.2 g acrylic acid methyl ester
5.6 g sulphur dioxide
3.9 g AMPS methyl ester

Solution 3
858 g methylcyclohexane
242.5 g acrylonitrile
16.2 g acrylic acid methyl ester
3.9 g AMPS methyl ester
25.4 g of a 7.5% solution of tertiary butyl hydro per oxide in methylcyclohexane.

The mixture is then stirred for 15 minutes at 45° C. and subsequently cooled to ambient temperature. It was filtered over a suction filter and the filter cake was washed with 500 g of methylcyclohexane. After drying at 50° C., 472 g of polymer (81.0% yield) with the following properties were isolated:
Acrylic acid methyl ester content 5.8% by weight
Sulphur content 0.44% by weight
K value 79.5
[$\eta$] 1.36 dl/g
Dye uptake 1.56% by weight

EXAMPLE 2

Example 1 was repeated with 0.55 g of methallyl sulphonic acid methyl ester in the starting material and with 2.6 g of methallyl sulphonic acid methyl ester in solution 2 and 3 respectively instead of the AMPS-methyl ester. 425 g of polymer (73.3% yield) with the following properties were isolated:
Acrylic acid methyl ester content 5.9% by weight
Sulphur content 0.46% by weight
K value: 77.5
[$\eta$]: 1.30 dl/g
dye uptake 2.02% by weight

EXAMPLE 3

Example 1 was repeated with following quantities:

Starting material
540 g methylcyclohexane
35.3 g acrylonitrile
1.65 g p-styrene sulphonic acid methyl ester
2.6 g of a 7.5% solution of tertiary butyl hydroperoxide in methylcyclohexane

Starter solution 1
21.1 g acrylonitrile
0.5 g sulphur dioxide

Solution 2
882 g methylcyclohexane
258.7 g acrylonitrile
5.2 g p-styrene sulphonic acid methyl ester
4.8 g sulphur dioxide

Solution 3
858 g methylcyclohexane
258.7 g acrylonitrile
5.2 g p-styrene sulphonic acid methyl ester
23.5 g of a 7.5% solution of tertiary butyl hydroperoxide in methylcyclohexane
445 g of polymer (76.0% yield) with the following properties were isolated:
Methoxyl group content 0.35% by weight
sulphur content: 0.58% by weight
K value: 78.0
[$\eta$] 1.31 dl/g
dye uptake 2.16% by weight After stirring for 1 hour in boiling water, the content of methoxy groups fell below 0.1% by weight.

EXAMPLE 4

Example 1 was repeated with 1.65 g of N(p-methoxysulphonyl phenyl)-maleic imide (produced via N-(p-chlorosulphonyl) maleic imide according to Soviet Patent No. 711285 (1979) and Houben/Weyl IX, page 663 et seq (1955) in the starting material and with 5.2 g in, solution 2 and 3 respectively instead of AMPS-methylester.
460 g of polymer (78.5% yield) with the following properties were isolated:
Acrylic acid methyl ester content: 5.8% by weight
sulphur content: 0.48% by weight
K value: 81.7
[$\eta$] 1.44 dl/g
dye uptake: 3.86% by weight

EXAMPLE 5

The following solutions were used for a continuously described polymerisation process:

Starting material 1
2550 g methylcyclohexane
510 g of an acrylonitrile/acrylic acid methyl ester copolymer (94:6) with a K value of 81
180 g acrylonitrile
11.5 g acrylic acid methyl ester
5.8 g of AMPS methyl ester
14 g of a 7.5% solution of tertiary butyl hydroperoxide in methylcyclohexane

Starter solution 2

160 g methyl cyclohexane
85 g acrylonitrile
5.5 g acrylic acid methyl ester
3 g sulphur dioxide

Additional solution 3

(Sufficient for 10 Hours Continuous Operation)

7350 g methylcyclohexane
2020 g acrylonitrile
135 g acrylic acid methyl ester
45 g AMPS - methyl ester
44.5 g sulphur dioxide

Addition solution 4

(Sufficient for 10 Hours Continuous Operation)

7150 g methylcyclohexane
2020 g acrylonitrile
135 g acrylic acid methyl ester
45 g AMPS methyl ester
209 g of 7.5% solution of tertiary butyl hydroperoxide in methyl cyclohexane.

The starting material 1 was introduced into a continuously operated 5 liter reactor equipped with a grid stirrer, a reflux condenser and an overflow pipe connected to the bottom outlet. After passing over nitrogen and heating to 45° C., polymerisation was initiated at a stirring speed of 130 rpm by addition of the starter solution 2.

Polymerisation was then continued at 45° C. by the uniform addition of 1250 ml/h of addition solution 3 and 1250 ml/h of addition solution 4 via pumps.

After attaining a filling level of 4.75 l, which was kept constant during further operation, about 1900 g of suspension was removed hourly and, after cooling it to 10° to 15° C., was worked up by filtration and washing with 1200 g of methylcyclohexane hourly.

After polymerisation for 4 hours, a stationary state was reached with respect to solids content of the suspension, conversion, polymer composition and molecular weight.

Solids in the suspension—18.5%
Polymer yield after drying—355 g/h
Conversion—80.7%
Acrylic acid methyl ester content—5.9% by weight
Sulphur content—0.55% by weight
K Value—81.2
$[\eta]$—1.40 dl/g
dye uptake—2.75% by weight

We claim:

1. A process for the production of sulphonic acid- and sulphonate group-containing acrylonitrile copolymers comprising copolymerization of 75 to 99.95% by weight of acrylonitrile, up to 24.95% by weight of further copolymerizable monomers free from ionic or sulphonic acid ester groups, and 0.05 to 8% by weight of a third component, the weight percentages relating to the total quantity of the monomers, in aliphatic hydrocarbons or in mixtures of aliphatic hydrocarbons using a redox catalyst comprising $SO_2$ and an organic hydroperoxide, the third component being an ethylenically unsaturated sulphonic acid ester free from carboxylic acid and carboxylic acid ester groups, the sulphonic acid ester groups of the copolymer are saponified before, during or after shaping.

2. A process according to claim 1, wherein the molar ratio of $SO_2$ to hydroperoxide is 1:1 to 6:1.

3. A process according to claim 1, wherein the hydroperoxide is substituted with secondary or tertiary alkyl groups or arylalkyl groups in quantities of 0.1 to 2 mole %, based on the monomer.

4. A process according to claim 1, wherein the third component is contained in amounts of 0.1 to 6% by weight.

5. A process according to claim 1, wherein the unsaturated sulphonic acid ester is selected from the group consisting of esters of vinyl sulphonic acid, esters of allyl sulphonic acid, esters of methallyl sulphonic acid, esters of styrene sulphonic acid, esters of 2-acrylamido-2-methylpropane sulphonic acid and esters of N-(sulphophenyl)-maleic imide.

6. A process according to claim 5, wherein the sulphonic acid esters are selected from the group consisting of vinyl sulphonic acid methylester, vinyl sulphonic acid ethyl ester and vinyl sulphonic acid butyl ester.

7. A process according to claim 5, wherein the esters of allyl and methallyl sulphonic acid are selected from the group consisting of allyl sulphonic acid methyl ester, allyl sulphonic acid ester, methallyl sulphonic acid methyl ester and methallyl sulphonic acid ethyl ester.

8. A process according to claim 5, wherein the esters of styrene sulphonic acid are selected from the group consisting of styrene sulphonic acid methyl ester, styrene sulphonic acid ethyl ester, styrene sulphonic acid propyl ester, styrene sulphonic acid butyl ester, styrene sulphonic acid isobutyl ester and styrene sulphonic acid hexyl ester.

9. A process according to claim 5, wherein the 2-acrylamido-2-methylpropane sulphonic acid is selected from the group consisting of 2-acrylamido-2-methylpropane sulphonic acid methylester and 2-acrylamido-2-methylpropane sulphonic ethyl ester.

10. A process according to claim 5, wherein the esters of N-(sulphophenyl)-maleic imide are selected from the group consisting of N(4-methoxysulphonylphenyl) maleic imide and N(4-ethoxysulphonylphenyl) maleic imide.

11. A process according to claim 1, wherein said further monomer is selected from the group consisting of esters acrylic acid, esters of methacrylic acid, vinyl esters of aliphatic carboxylic acids, styrene, alpha-methyl styrene, 4-tertiary-butyl styrene, maleic acid anhydride and N-substituted maleic acid imides, the substituent being a linear, branched or cyclic alkyl radical with up to 12 carbon atoms or an unsubstituted or substituted aromatic ring.

12. A process according to claim 1, wherein said hydrocarbon has a boiling point of $-10°$ C. to $+135°$ C.

13. A process according to claim 1, wherein the hydrocarbon has a boiling point of 90° C. to 130° C.

14. A process according to claim 1, wherein the hydrocarbon is selected from the group consisting of n-butane, n-pentane, n-hexane, octane, cyclohexane, methyl cyclohexane, petroleum ether, light petroleum and ligroin.

15. A process according to claim 1, wherein the $SO_2$ is contained in amounts of a 1 to 8.0 mole %, based on the monomer.

16. A process according to claim 1, further comprising the presence of a system-soluble acid in quantities of 0.01 to 1.0 mole % based on the monomer, said acid selected from the group consisting of partially halogenated and perhalogenated carboxylic acids with up to 10 carbon atoms.

17. A process according to claim 16, wherein the acid is selected from the group consisting of trichloroacetic acid, perchloropropionic acid and perchlorobutyric acid.

* * * * *